No. 820,059. PATENTED MAY 8, 1906.
R. B. MILES.
FOLDING VEHICLE TOP.
APPLICATION FILED AUG. 18, 1905.
2 SHEETS—SHEET 1.
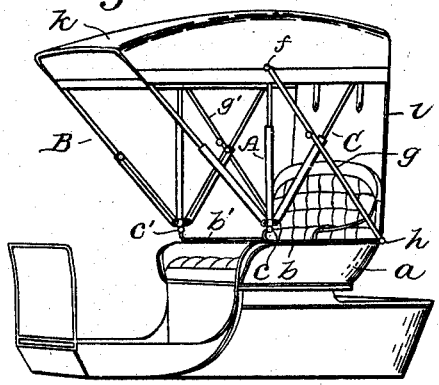
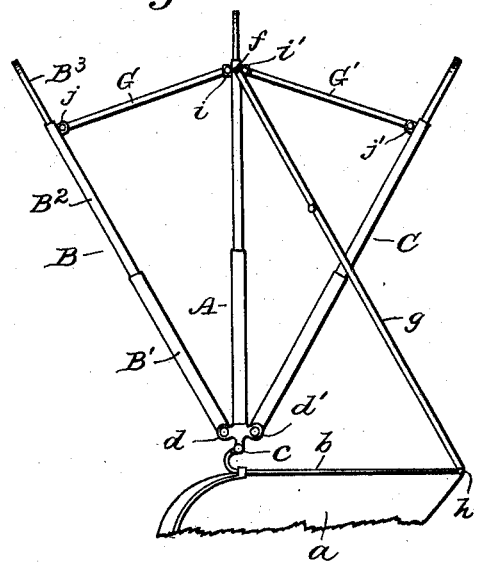
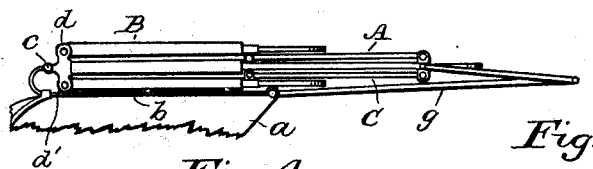
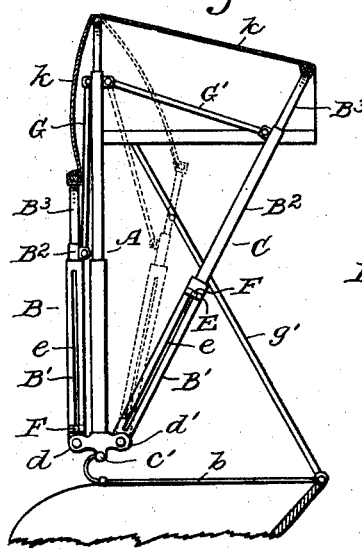
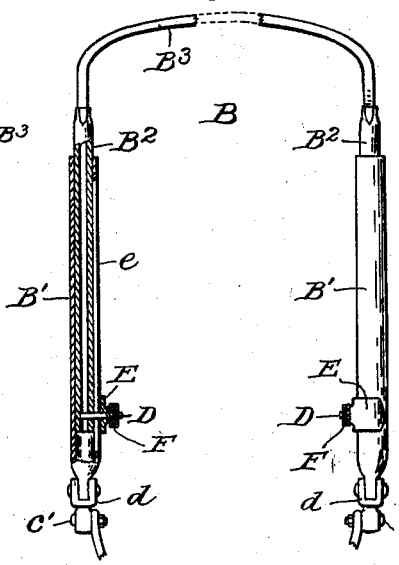
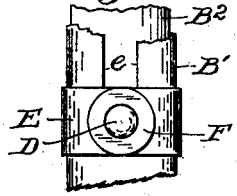
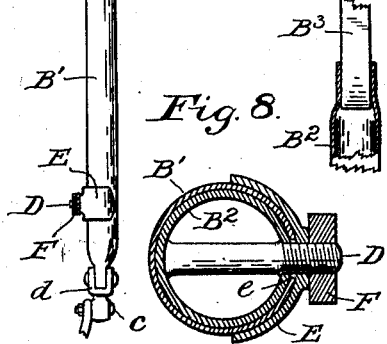
Witnesses:
B. L. Doyle.
Stella Snider.
Inventor:
Richard B. Miles,
by
E. T. Silvius,
Attorney.

No. 820,059. PATENTED MAY 8, 1906.
R. B. MILES.
FOLDING VEHICLE TOP.
APPLICATION FILED AUG. 18, 1905.

2 SHEETS—SHEET 2.

Witnesses:
B. L. Boyle.
Stella Snider.

Inventor:
Richard B. Miles,
by E. T. Silvius,
Attorney.

UNITED STATES PATENT OFFICE.

RICHARD B. MILES, OF INDIANAPOLIS, INDIANA.

FOLDING VEHICLE-TOP.

No. 820,059.      Specification of Letters Patent.      Patented May 8, 1906.

Application filed August 18, 1905. Serial No. 274,661.

*To all whom it may concern:*

Be it known that I, RICHARD B. MILES, a citizen of the United States, residing at Indianapolis, in the county of Marion and State of Indiana, have invented new and useful Improvements in Folding Vehicle-Tops; and I do declare the following to be a full, clear, and exact description of the invention, reference being had to the accompanying drawings, and to the letters of reference marked thereon, which form a part of this specification.

This invention relates to buggy-tops and tops for similar vehicles, such as the various styles of carriages and automobiles, and the invention has particular reference to the bows that comprise parts of the frames of the tops.

Objects of the invention are to provide vehicle-tops that may be folded and let down without creasing or breaking the leather or similar coverings thereof and to provide vehicle-tops of suitable construction that may permit of the front or the rear parts thereof to be lowered independently, so as to provide sun-shades for the occupants of the vehicles when the sun may be low in the heavens.

The invention consists in a vehicle-top having a frame that includes a front bow and a rear bow that are adapted to be adjusted in length, so as to vary the height thereof when the top is raised, each one of the bows being designed to draw the cover down toward the middle or main bow without the cover being creased; and the invention consists, further, in the novel parts and in the combinations and arrangements of parts, as hereinafter particularly described and claimed.

Figure 9:
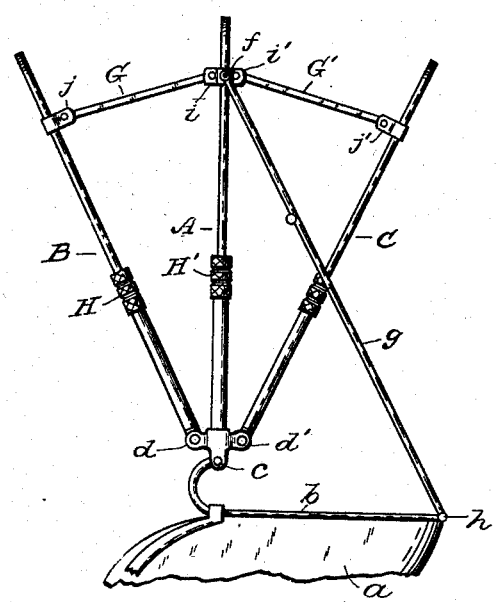
Figure 11:
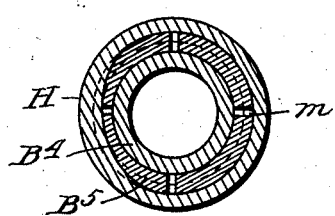
Figure 12:
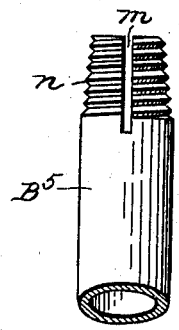
Figure 10:
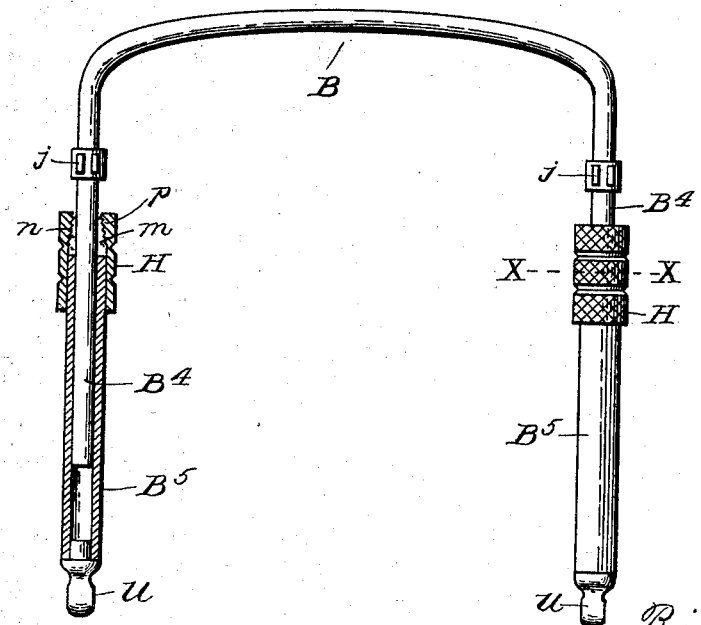
Figure 13:
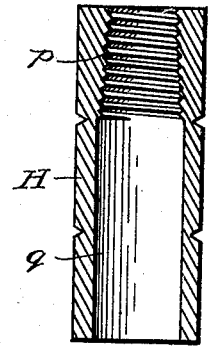

Referring to the drawings, Figure 1 is a perspective view of a buggy body and top, illustrating the invention in one of its specific forms in connection therewith; Fig. 2, a side elevation of the frame of the top in its raised position; Fig. 3, a side elevation of the frame in its lower or folded position; Fig. 4, a longitudinal vertical sectional view of the top, showing the front bow shortened telescopically and folded back against the main bow and the position of the rear bow in dotted lines as when partly folded; Fig. 5, a front elevation of the front bow, in which parts are in section; Fig. 6, a fragmentary side elevation showing portions of the telescopic side parts of a bow; Fig. 7, a sectional detail of parts of a bow; Fig. 8, a horizontal or transverse sectional view showing the binding devices for the telescopic side parts of a bow; Fig. 9, a side elevation of the frame of the top in its raised position, showing the bows constructed slightly different in parts from those shown in the preceding figures; Fig. 10, a rear elevation of the front bow shown in Fig. 9, showing portions thereof in section; Fig. 11, a transverse sectional view on the line X X in Fig. 10; Fig. 12, a fragmentary side elevation of the bow shown in Fig. 10, showing the contractible end of a part thereof; and Fig. 13, a central sectional view of a binding-nut of the bow adapted to coöperate with the part shown in Fig. 12.

Similar reference characters in the different figures of the drawings designate like elements or features.

In the drawings, $a$ designates the seat-frame of a vehicle-body, and $b$ and $b'$ the irons for connecting the vehicle-top to the seat-frame. The main bow A is supported by the irons by means of pivots $c$ and $c'$, and the main bow has at the lower end of each side part thereof a pair of ears $d$ and $d'$, as is customary, the front bow B and the rear bow C being pivoted to the ears in a well-known manner.

In a practical embodiment of the invention in one specific form thereof the front bow B, Figs. 1 to 8, inclusive, comprises telescopic side or upright parts, each side part being composed of a tubular lower section $B'$, having a longitudinal slot $e$ and pivoted at its lower end to an ear $d$, and an upper section $B^2$, preferably composed of a tube extending into the lower section and provided at its lower end with a fixed binding-screw D, extending through the slot $e$. A concavo-convex washer E is placed on the binding-screw against the section $B'$, and a thumb-nut F is fitted onto the binding-screw, whereby the two sections may be adjustably held together. The rear bow C also is constructed identically as above described and is pivoted to the ears $d'$. The upper parts of the main bow, as usual, have studs $f$ attached thereto, one at either side of the bow, and knuckled braces $g$ and $g'$ are pivoted to the studs and also to studs $h$ of the irons $b$ and $b'$ for holding the top uprightly. The main bow A is provided near the top of each side part thereof with a pair of ears $i$ and $i'$ at opposite sides thereof, one ear being forward and the other ear rearward. The upper portion of each side part of the bow B is provided with an ear $j$, projecting rearwardly, and the upper portion of each side part of the bow C is provided with an ear $j'$, projecting forwardly. A spreader G extends from an ear $i$ to an ear $j$, and a spreader G' extends from an ear $i'$ to an ear $j'$, the spreaders being pivoted to the ears and preferably composed of stiff metallic bars or rods, either solid or hollow. The arch part of each bow, as $B^3$, is preferably composed of wood and secured suitably to the sections $B^2$ of the bow, as in Fig. 7, the side parts of the main bow A being also composed of tubing, but are not telescopic. If preferred, however, the arch parts may be metallic and integral with the side parts of the bow. The cover $k$ is attached to all of the arch parts of the bows, and the sides of the cover may be held to the frame in various ways, as by tacks and providing folding creases, or the sides may be made of overlapping pieces that may operate telescopically when the top folds. The rear curtain $l$ may be of the full width of the top and may be arranged so as to be rolled up, as usual. Side curtains may be provided, as usual.

In another specific form of construction (shown in Figs. 9 to 13, inclusive, which form may in some cases be preferred) the bows and connecting parts are substantially as above described, except as to certain parts of the bows that will now be described. The bows B and C each comprise two side-part sections $B^4$, formed integral with the arch part of the bow, of either solid or tubular metal, the sections $B^4$ being movable longitudinally in the lower sections $B^5$, which are tubular and have pivoting-blades $u$ at their lower ends, their upper ends having slots $m$ therein and also external screw-threads $n$ on tapering surfaces. A binding-nut H has a tapering part in one end thereof provided with screw-threads $p$ for engagement with the threads $n$ to contract the end of the section $B^5$ on the section $B^4$, the nut also having a straight internal part $q$ fitting freely over the section $B^5$ beyond the threads $n$. The straight part is devoid of threads and serves as a guide, being an extension of the nut, that affords ample gripping facilities for the hand when manipulating the nut, which has a roughened exterior. The bow A has a part H' at each side thereof in imitation of the exterior of the nuts H in order to be uniform in appearance, but may be omitted, if desired.

It will be clear from the foregoing that the telescopic side parts of the bows may be held or loosened at will by manipulation of the binding-nuts H.

In practical use the top may be raised and lowered by means of the braces $g$ and $g'$ without shortening or folding the front and rear bows, if desired. If, however, it be desired to fold the top down closely, the thumb-nuts F may be loosened to permit the sections $B^2$ to slide into the sections B' of the bows B and C, and while the upper sections move downwardly they, with the lower sections of the bows, will be drawn by the spreaders close to the main bow, the cover $k$ being drawn down also without the top thereof being creased. Either the front bow or the rear bow may be lowered partially to serve as a sun-shade when desired. The binding-nuts H are to be manipulated in order to adjust the bows B and C when constructed as shown in Figs. 9 to 13.

It is to be understood that various forms of extensions may be applied to the front and rear bows when a relatively long top is desired, it being obvious also that an additional telescopic bow may be pivoted to the front bow B.

Having thus described the invention, what is claimed as new is—

1. A vehicle-top including a pivoted main bow having two pairs of spreader-bars pivotally supported thereby, with two contractible bows pivoted to the main bow and also to the pairs of spreader-bars.

2. A vehicle-top including a pivoted main bow having ears attached to the front and rear sides thereof, a pair of spreaders pivoted to the forward ears, a pair of spreaders pivoted to the rearward ears, contractible bows each pivoted to a different pair of the spreaders, and a cover extending over the spreaders.

3. A vehicle-top including a pivoted main bow, two pairs of spreader-bars pivoted to the main bow and swinging to or from the side parts of the bow, front and rear pivoted bows having each a relatively movable upper part pivoted to and supported by a pair of the spreader-bars, and means for supporting the movable parts of the bows independently of the spreader-bars.

4. A vehicle-top comprising a non-contractible main bow having forward and rearward ears attached thereto, two pairs of bow side parts each slitted at an end thereof and pivoted at the opposite end thereof to the main bow, binding-nuts screwed over the slitted ends of the side parts and extending appreciably beyond the ends of the slits, a pair of bow-arches having ears attached thereto and having end parts extending through the slitted ends of the side parts, two pairs of spreader-bars, one pair pivoted to the forward ears of the main bow and also to the ears of one of the bow-arches and the other pair pivoted to the rearward ears of the main bow and also to the ears of the other one of the bow-arches, and a cover extending over the ears and the spreader-bars.

In testimony whereof I affix my signature in presence of two witnesses.

RICHARD B. MILES.

Witnesses:
 WM. H. PAYNE,
 H. L. MILES.